April 16, 1957 F. L. HOWELL 2,789,007
VEHICLE BODY VENTILATING AND DEFROSTING MEANS
Filed May 5, 1954 2 Sheets-Sheet 2

Inventor:
Frank Lester Howell
Paul O. Pippel Atty.

United States Patent Office 2,789,007
Patented Apr. 16, 1957

2,789,007

VEHICLE BODY VENTILATING AND DEFROSTING MEANS

Frank Lester Howell, Fort Wayne, Ind., assignor to International Harvester Company, a corporation of New Jersey Application May 5, 1954, Serial No. 427,772

8 Claims. (Cl. 296—28)

This invention relates to a new and improved motor vehicle body construction, and more particularly to ventilating air distributing means for an enclosed operator's compartment.

The primary objective of the present invention is to provide a body structure defining the upper, forward limit of an operator's compartment of a motor vehicle which is fabricated out of sheet metal stampings of relatively simplified form and having edge conformations adapting them for easy assembly to mating stampings and in which the assembled stampings provide unique means for admitting and directing fresh air and heated air to the interior of the operator's compartment. The above objective is accomplished by the present invention without impairing the strength, rigidity, and durability of the vehicle body.

A further object is the provision of a hot air plenum chamber disposed below the base of the windshield frame and extending substantially the entire length thereof which is provided with an elongated discharge opening adjacent the base of the windshield frame. The discharge opening also extends substantially the full length of the windshield frame. By virtue of such construction, heated air is directed to the entire windshield rather than to portions thereof as in prior art constructions.

A still further object is the provision of a transversely extending plenum chamber formed by portions of the vehicle cowl bar and instrument panel. Hence, the invention contemplates using these body structure components for a purpose other than to merely strengthen and rigidify the body and to support the various instruments.

The invention further contemplates the provision of a pair of fresh air supply ducts leading from an area spaced forwardly of and just below the base of the windshield frame where the air is relatively clear of noxious gases and fumes to ports provided in the instrument panel and opening into the interior of the operator's compartment.

Figure 1:
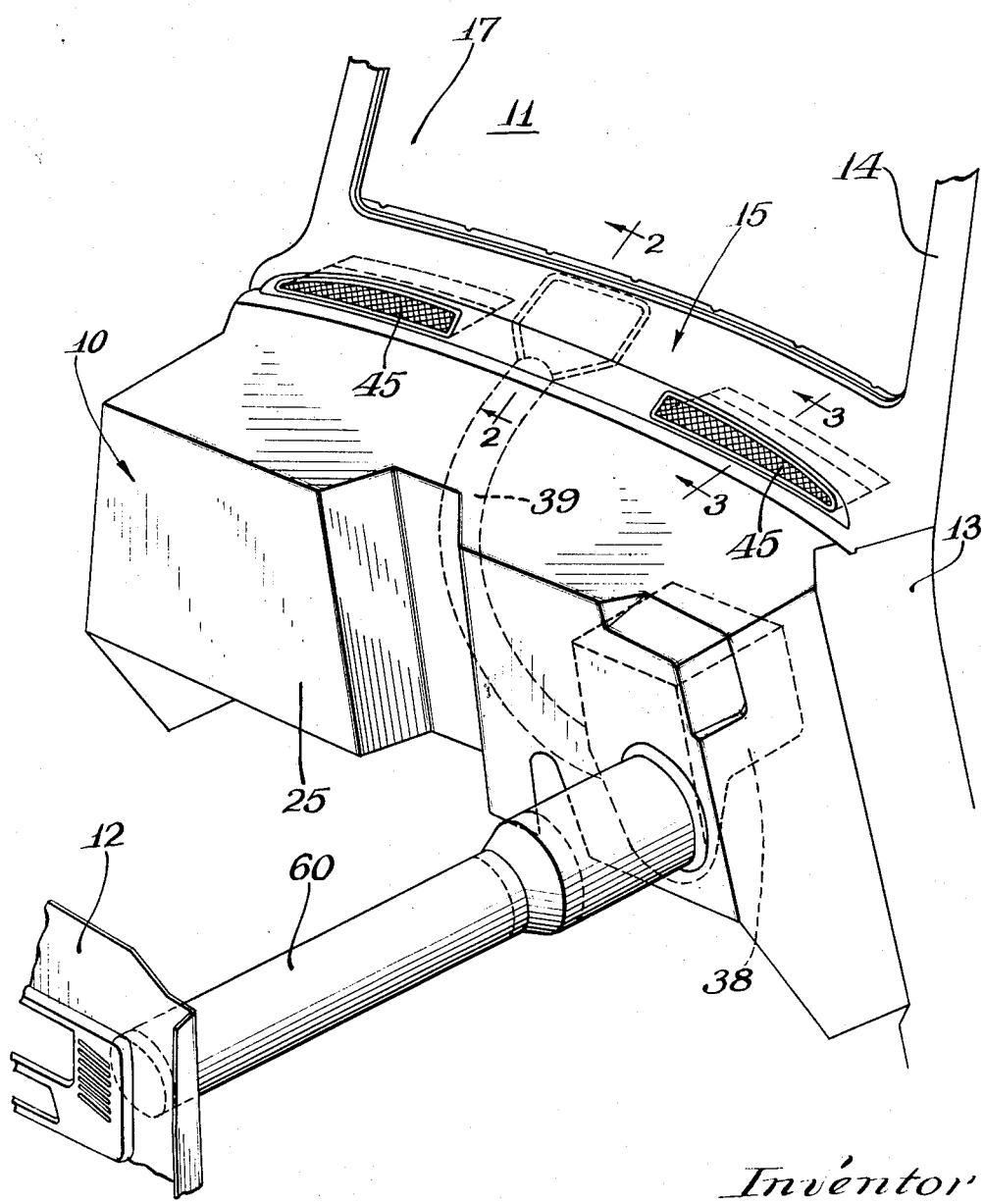
Figure 2:
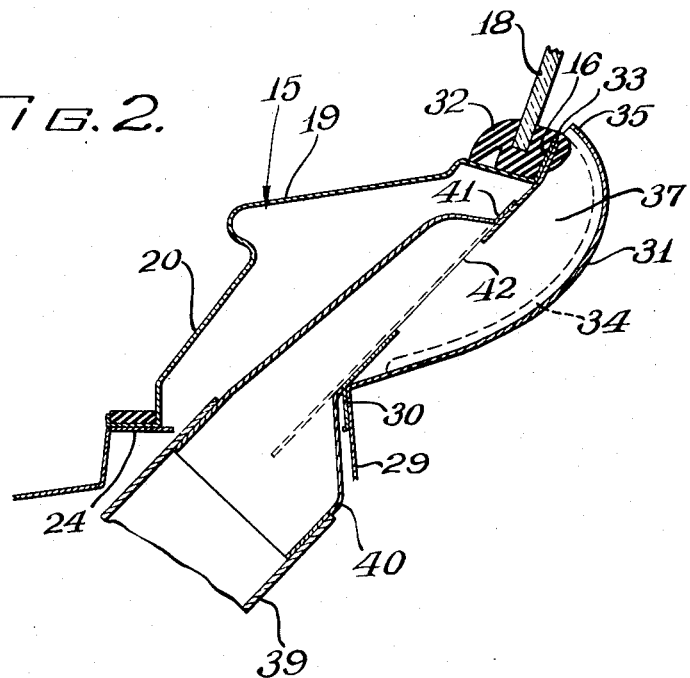
Figure 3:
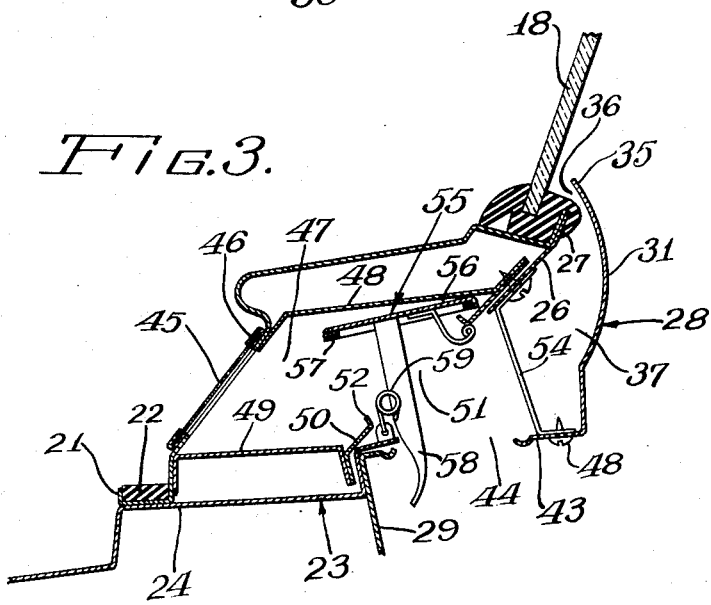

The foregoing and other important objects and desirable features inherent in and encompassed by the invention, together with many of the purposes and uses thereof, will become readily apparent from a reading of the ensuing description in conjunction with the annexed drawings, in which, Figure 1 is a perspective view of the front portion of a motor truck body embodying the invention;

Figure 2 is a sectional view taken substantially along line 2—2 of Figure 1; and Figure 3 is a sectional view taken substantially along line 3—3 of Figure 1.

Referring to the drawings in detail, wherein like reference characters represent like elements throughout the various views, there is shown a forward wall 10 of a motor truck operator's compartment or cab 11 embodying the invention. The wall 10 is spaced rearwardly of a grille panel 12 (partially shown in Figure 1) which forms the forward wall of the engine compartment (not shown).

The operator's compartment 11 is mounted on a chassis frame (not shown) rearwardly of the engine and includes a pair of transversely spaced door pillar posts 13. The windshield frame 14 is formed as a unitary stamping with a forwardly extending cowl panel 15. The top edge of the windshield frame 14 is rigidly secured to the forward edge of the cab roof (not shown) by any suitable means and the bottom transversely spaced ends of the unitary stamping are similarly connected to the pillar posts 13.

A continuous, inwardly directed flange 16 outlines the windshield opening 17. A glass window pane 18 is mounted in the frame 14 and defines the upper, forward limit of the operator's compartment 11. The cowl panel 15 which is integral with the windshield frame 14 includes a generally horizontally extending section 19 projecting forwardly of the base of the windshield frame and an integrally formed, inclined section 20 depending angularly from the horizontal section 19. The lower edge of the inclined section 20 is in the form of an upwardly facing channel 21 which serves as a pocket for retaining a strip 22 of rubber or like material. The rearwardmost edge of the engine compartment hood panel (not shown) is adapted to abut the strip 22 and prevent the entrance of water, dirt, etc. in the engine compartment.

Extending transversely from one side of the operator's compartment 11 to the opposite side is a cowl bar 23 which has one edge thereof welded to the underside of the web of channel 21. The cowl bar 23 comprises a rearward, generally horizontal section 24 vertically spaced below the horizontal section 19 of the cowl panel 15 and the base of the windshield frame 14. Fastened to the extreme forward edge of the cowl bar 23 and depending therefrom is a dash panel 25 which completes the wall separating the engine compartment from the operator's compartment 11. The cowl bar 23 further includes an inclined section 26 integrally formed with and extending rearwardly and upwardly from the horizontal section 24. A flange 27 provided on the upper marginal edge of the inclined section 26 abuts a portion of the flange 16 and is welded thereto. By virtue of the above described structure, it will be obvious that the cowl bar 23 and the cowl panel 15 form a structure which extends transversely across the vehicle and has a box section which greatly improves the strength and rigidity of the truck cab without materially increasing the weight thereof.

An instrument panel, designated generally by numeral 28, extends transversely from one side of the operator's compartment 11 to the opposite side thereof and includes a generally vertically disposed section 29. The upper extremity of the section 29 is secured to the cowl bar 23 at the junction 30 of the inclined and horizontal sections 26, 24, respectively. The instrument panel 28 supports the various vehicle control members such as the choke, ignition switch and gauges (not shown) as in conventional vehicles. Extending rearwardly and upwardly from the junction 30 is an instrument panel section 31 which is integrally formed with the vertical section 29.

The window pane 18 is mounted in a rubber strip 32 having an outwardly opening groove 33 which embraces the flanges 16 and 27 at the base of the windshield frame 14. A plurality of vertically disposed depressions are formed in the instrument panel section 31 to provide ribs 34 (one of which is shown in Figure 2) for rigidifying the instrument panel 28. The uppermost marginal edge 35 of the section 31 terminates at the base of the windshield frame 14 and the ribs 34 are adapted to abut the rubber strip 32. It will be appreciated that by virtue of the above described construction, the edge 35 is maintained in a spaced relationship with the flanges 27 and 16 to provide an elongated opening 36 which extends transversely from one end of the windshield frame 14 to the opposite end thereof and is disposed at the base of the windshield frame. The inclined section 26 of the cowl bar 23 and the instrument panel section 31 form the walls of a hot air plenum chamber 37 and the elongated opening 36 serves as the hot air discharge means for directing heated air to the base of the windshield 18 to prevent the formation of ice and moisture thereon.

Heated air is supplied to the plenum chamber 37 by means of an air heater 38, which may be a conventional type without departing from the spirit and scope of the invention, mounted on the dash panel 25. Air is admitted to the heater 38 through a pipe 60 which extends between the heater and an opening in the grille panel 12. The temperature of the air passing through the heater 38 is controlled by means not shown but which are found in conventional heaters. Leading from the heater 38 is a discharge pipe 39 having a nozzle 40 secured to its free end. The nozzle 40 is provided with an outwardly extending, continuous flange 41 which is rigidly secured to the peripheral surface of the cowl bar inclined section 26 outlining a centrally located opening 42 formed therein. Thus, air from the heater 38 enters the plenum chamber 37 at a point midway between its transverse ends and is distributed and discharged along the entire length of the windshield frame 14 through the elongated opening 36.

As best shown in Figure 3, two transversely spaced portions 43 of the instrument panel section 31 are formed to lie in a substantially horizontal plane. Each portion 43 is provided with a port 44 which opens downwardly into the operator's compartment 11 rearwardly of the instrument panel vertical section 29. A pair of transversely spaced openings 45, arranged in longitudinal alignment with the ports 44, are provided in the cowl panel inclined section 20. A screen assembly 46 is fastened to the inclined section 20 over each opening 45 by suitable means to prevent bugs and other foreign elements from passing through the inclined section. A fresh air supply duct, designated generally by numeral 47 leads from each opening 45 to a respective port 44. It will be appreciated that air is forced directly into the operator's compartment 11 through the ducts 47 when the vehicle is in motion. Each duct 47 includes top and bottom walls 48, 49, respectively, suitably connected together and to the inclined sections 20 and cowl bar inclined section 26. Secured to each pair of top and bottom walls 48, 49 is an intermediate plate 50 having an opening 51 therein encircled by a lip 52, as shown in Figure 3. Each opening 51 is in longitudinal alignment with an opening in the cowl bar inclined section 20. The back or rearwardmost wall of each duct 47 comprises a plate 54 having its bottom edge secured to the instrument panel section 31 rearwardly of the ports 44 by means of screws 48 (only one is shown). The plates 54 extend upwardly and slightly forwardly and are secured to the cowl bar inclined section 20 adjacent the upper marginal edge of the transversely spaced openings therein. It will be appreciated that the plates 54 not only serve as baffles for directing the incoming fresh air downwardly into the operator's compartment 11 but also strengthen and rigidify the instrument panel 28.

In order to regulate the flow of fresh air entering the operator's compartment 11 from the ducts 47, each duct 47 is provided with a ventilator valve device, designated generally by numeral 55, which includes a closure member 56. Each closure member 56 is pivotally connected to a respective intermediate plate 50 whereby it is capable of swinging about a horizontal axis between a fully opened position, shown in Figure 3, and a closed position wherein a strip 57 of rubber or like material fastened to the underside of the closure members adjacent its marginal edge abuts the lip 52. In the closed position air, water, and dirt are prevented from flowing through the ports 44 to the interior of the operator's compartment 11. Attached to each closure member 56 is an operating handle 58 which extends downwardly through a respective port 44 and is conveniently grippable by the operator to rock the closure member between its open and closed positions. The closure members 56 are maintained in either of their two positions of adjustment by means of overcenter springs 59. Each spring has one end engaging a respective operating handle 58 and its opposite end pivotally connected to the cowl bar inclined section 20.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to support, such other adaptations and modifications of the invention as fall within the spirit and scope of the invention as defined in the appended claims.

What is claimed is:

1. In a motor vehicle having an enclosed operator's compartment having a windshield opening therein, the combination comprising, a unitary metal stamping formed with a windshield frame and a forwardly extending cowl panel, said frame outlining the windshield opening and said cowl panel including a substantially horizontal section and an inclined section depending angularly therefrom, said inclined section having a pair of screen covered, transversely spaced openings therein; a cowl bar having one edge secured to the lowermost edge of said inclined section, said bar being formed with a rearwardly extending section vertically spaced below said cowl panel horizontal section and an upwardly and rearwardly inclined section provided with a flange for connection with the base of said windshield frame; an instrument panel secured to said cowl bar at the intersection of said cowl bar rearwardly extending section and said cowl bar inclined section, said instrument panel including a rearwardly and upwardly extending section having downwardly facing ports therein in longitudinal alignment, respectively, with said openings in said cowl panel inclined section, said section of said instrument panel and said inclined section of said cowl bar defining a hot air-receiving chamber extending transversely from one end of said windshield frame to the opposite end thereof, the uppermost edge of said instrument panel section being spaced from said cowl bar flange to form an elongated discharge opening for directing heated air to the base of said windshield frame, said cowl bar inclined section having an opening therein intermediate its transverse ends for permitting hot air to enter said hot air-receiving chamber; and a pair of fresh air supply ducts formed through said cowl bar inclined section, each duct extending from a respective opening in said cowl panel inclined section to a respective port in said instrument panel for directing cold air from without said operator's compartment to the interior thereof.

2. The combination substantially as set forth in claim 1, in which, manually controlled valve means disposed within each duct are provided for regulating the flow of fresh air through said ports.

3. In a motor vehicle having an operator's compartment provided with a windshield opening therein, a windshield frame outlining said windshield opening, a cowl panel integral with said windshield frame and including an inclined section spaced forwardly of and below the base of said windshield frame, said inclined section having a pair of openings therein; a hot air plenum chamber disposed below and extending transversely substantially the full length of the base of said windshield frame, comprising, a cowl bar having its upper marginal edge secured to the base of said windshield frame and including a forwardly and downwardly inclined section serving as a wall of said chamber, said section being provided with a centrally located opening therein for receiving heated air and an integral, substantially horizontal forwardly extending section spaced below the base of said windshield frame and secured to the lowermost edge of said cowl panel inclined section, and an instrument panel having a portion thereof secured to said cowl bar at the intersection of said cowl bar inclined and horizontal sections, said instrument panel including a section extending rearwardly and upwardly from the intersection of said cowl bar inclined and horizontal sections and serving as a wall of said chamber and having a pair of transversely spaced, downwardly facing ports therein opening into the interior of said operator's compartment, said instrument panel including a section depending substantially vertically from said intersection and being spaced forwardly of said ports, the uppermost marginal edge of said instrument panel inclined section being spaced from the uppermost edge of said cowl bar inclined section to provide an elongated hot air discharge opening extending substantially from one end of said windshield frame to its opposite end; and a pair of fresh air supply ducts formed through said cowl bar inclined section, each duct extending longitudinally from a respective opening in said cowl panel inclined section to a respective port in said instrument panel section for directing fresh air from without said operator's compartment to the interior thereof, said ducts being vertically spaced between said cowl bar horizontal section and the base of said windshield frame and being partially disposed in said chamber.

4. The combination substantially as set forth in claim 3, in which, manually controlled valve means disposed within each duct are provided for regulating the flow of fresh air through said ports.

5. In a motor vehicle having an operator's compartment provided with a transversely extending windshield frame, a hot air plenum chamber disposed below the base of said windshield frame and extending transversely substantially the full length thereof comprising, a cowl bar having its uppermost marginal edge secured to the base of said windshield frame and including a forwardly and downwardly inclined section serving as a wall of said chamber, said section being provided with a centrally located opening therein for receiving heated air, and an instrument panel having a portion thereof secured to said cowl bar at the lowermost edge of said inclined section, said instrument panel including a section extending rearwardly and upwardly from the lowermost edge of said cowl bar inclined section and serving as a wall of said chamber, the uppermost, terminal edge of said instrument panel section being spaced from the base of said windshield frame to provide an elongated air discharge opening extending substantially from one end of said windshield frame to its opposite end, said instrument panel section being further provided with a pair of transversely spaced, downwardly facing ports opening into the interior of said operator's compartment; and a pair of longitudinally extending fresh air supply ducts partially disposed within said chamber and in communication with said ports and the atmosphere exteriorly of the operator's compartment.

6. The combination substantially as set forth in claim 5, in which, manually controlled valve means disposed within each duct are provided for regulating a flow of fresh air through said ports.

7. In a motor vehicle having an operator's compartment provided with a transversely extending windshield frame, a hot air plenum chamber disposed below the base of said windshield frame and extending transversely substantially the full length thereof comprising, a cowl bar having an inclined section and a forwardly extending, substantially horizontal section vertically spaced below the base of said windshield frame, said inclined section having its uppermost marginal edge secured to the base of said windshield frame and extending downward and forwardly therefrom, said inclined section serving as a wall of said chamber and being provided with a centrally located opening therein for receiving heated air, an instrument panel having a portion thereof secured to said cowl bar at the intersection of said cowl bar inclined and horizontal sections, said instrument panel including a section extending rearwardly and upwardly from the intersection of said cowl bar inclined and horizontal sections and serving as a wall of said chamber, said instrument panel section having a pair of transversely spaced, downwardly facing ports therein opening into the interior of said operator's compartment and having its uppermost, terminal edge spaced from the uppermost marginal edge of said cowl bar inclined section to provide an elongated air discharge opening extending substantially from one end of said windshield frame to its opposite end; and a pair of longitudinally extending fresh air supply ducts vertically spaced between the base of said windshield frame and said cowl bar horizontal section, said ducts being partially disposed within said chamber and in communication with said ports and the atmosphere exteriorly of the operator's compartment.

8. The combination substantially as set forth in claim 7, in which, manually controlled valve means disposed within each duct are provided for regulating the flow of fresh air through said ports.

References Cited in the file of this patent
UNITED STATES PATENTS

| 1,862,022 | Ledwinka | June 7, 1932 |
| 2,045,044 | Modine | June 23, 1936 |
| 2,173,893 | Wermich | Sept. 26, 1939 |
| 2,298,163 | Raney | Oct. 6, 1942 |
| 2,430,759 | Crise | Nov. 11, 1947 |
| 2,613,985 | Ulrich | Oct. 14, 1952 |